United States Patent [19]
Loth et al.

[11] Patent Number: 4,916,485
[45] Date of Patent: Apr. 10, 1990

[54] XENON OPTICAL SYSTEM FOR CINEMATOGRAPH PROJECTION

[75] Inventors: Stanislaw Loth, Nanuet, N.Y.; Anthony Petitto, Los Angeles, Calif.

[73] Assignee: Parallex Company, Inc., Los Angeles, Calif.

[21] Appl. No.: 381,370

[22] Filed: Jul. 18, 1989

[51] Int. Cl.$^4$ .................. G03B 21/00; G03B 21/20
[52] U.S. Cl. ........................ 352/198; 352/57; 352/239
[58] Field of Search ............ 352/57, 60, 65, 69, 352/239, 198

[56] References Cited
U.S. PATENT DOCUMENTS

| | | | |
|---|---|---|---|
| 3,551,036 | 12/1970 | Bielusici | 352/65 |
| 4,372,656 | 2/1983 | Marks et al. | 352/57 |
| 4,560,260 | 12/1985 | Trumbull | 352/69 |

FOREIGN PATENT DOCUMENTS 540400  7/1922  France ...................... 352/198

Primary Examiner—Monroe H. Hayes
Attorney, Agent, or Firm—Watson, Cole, Grindle & Watson

[57] ABSTRACT

A film projector has side-by-side lamphouses each containing a xenon light source, light beam reflectors and a condensor lens for reshaping the reflected circular light beams into horizontal ellipsoidal light beams flattened by masking for the projection of stereo images by a pair of projection lenses having their optical axes coincident with diagonally related images of a stereoscopic image pair. Non-stereo images may likewise be selectively projected.

14 Claims, 2 Drawing Sheets

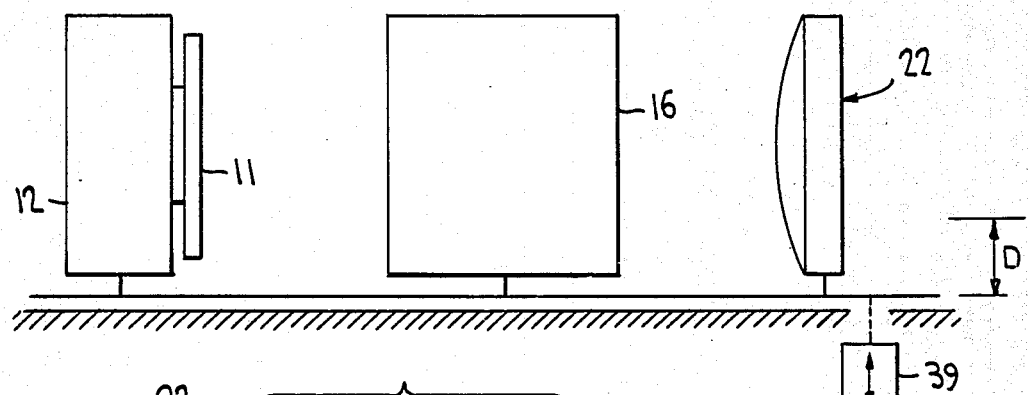
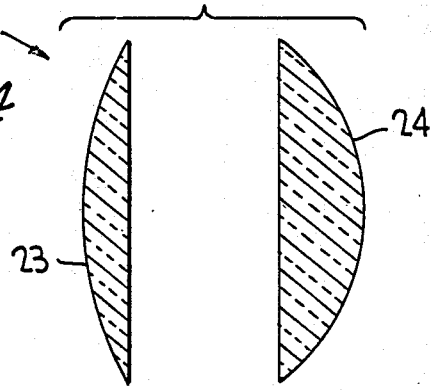
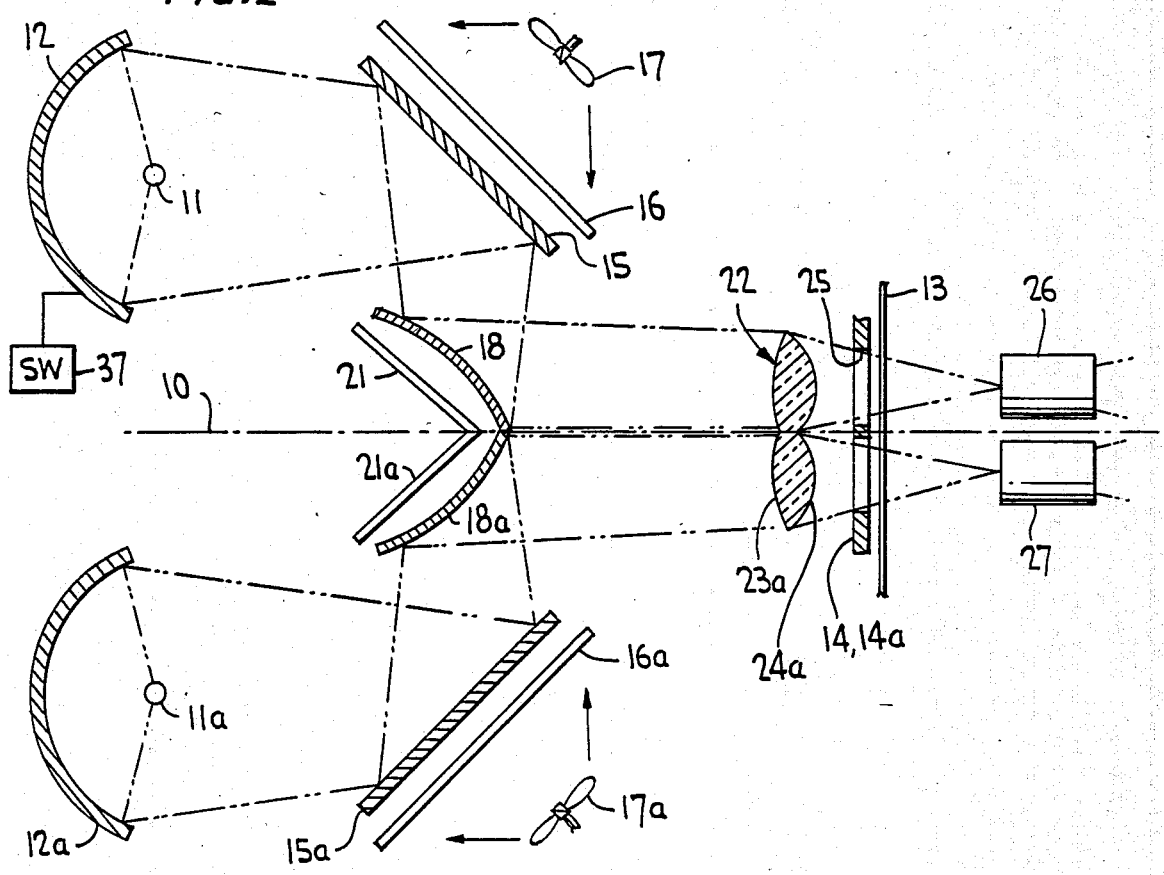

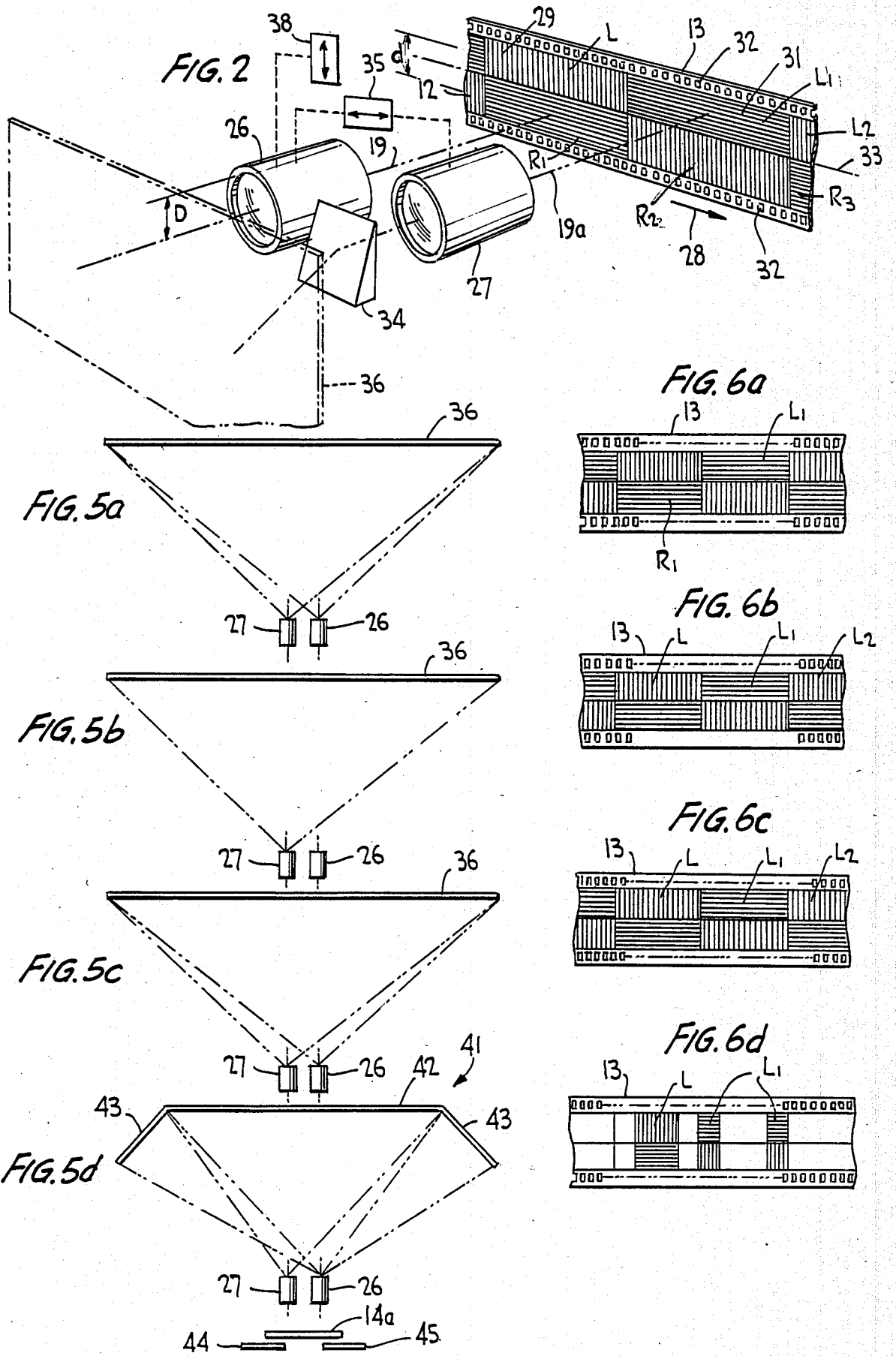

XENON OPTICAL SYSTEM FOR CINEMATOGRAPH PROJECTION

RELATED APPLICATIONS

This application relates to U.S. Ser. No. 381,300, filed July 18, 1989, entitled Stereoscopic Motion Picture Apparatus With Horizontal Film Movement, and to U.S. Ser. No. 381,299, filed July 18, 1989, entitled Geneva Drive Mechanism For Cinematograph Projection, both commonly owned herewith.

BACKGROUND OF THE INVENTION

This invention relates to a motion picture projector which projects a images from a 70 mm wide film moving horizontally, having fifteen film feed perforations per film frame and per film image and having an aspect ratio of 3:1. This image can be projected as a flat image or as a stereoscopic image on a wide screen of about 50 feet high and 150 wide with maximum light efficiency. The projector includes a pair of side-by-side lamphouses each having a 7,000 watt xenon bulb, an optical condensor system and being designed to control the heat on the aperture plate which protects the expensive 70 mm film.

U.S. Pat. No. 2,938,425 discloses a motion picture projector for a vertically moving stereoscopic film having over and under stereo image pairs and using special shutter mechanisms for the projector.

U.S. Pat. No. 3,425,775 discloses a stereo projector for double image vertically moving film having laterally anamorphotically compressed images.

U.S. Pat. No. 3,302,517 discloses a xenon optics system having a first lens means for collecting light emitted from a xenon light source into a converging beam and a second lens means for forming an image in the projection lens of the projector that is void of any representation of the portion of the source containing the electrodes or the light which is disposed immediately adjacent thereto.

SUMMARY OF THE INVENTION

An object of the present invention is to avoid the many limitations of the prior art film projector systems by the provision of a xenon optical projector capable of projecting 70 mm film equally distributed across the full surface of a wide screen with improved illumination in a simple and economical yet highly efficient manner. According to the present invention, stereoscopic image pairs are projected from a 70 mm wide picture film, moving horizontally, having fifteen film feed perforations per film frame and per film image and an aspect ratio of 3:1. The right and left images of each succeeding stereo image pair are located diagonally on adjacent film frames and each occupy one-half the width and the full length of its respective frame.

The optical system of the projector creates a stereoscopic effect by overlapping the stereoscopic image pair vertically using a glass wedge located along the optical axis of one of a pair of projection lenses. The other light pass is projected directly through the other projection lens, the pair of projection lenses being provided respectively coincident with the film images of a stereoscopic image pair for effecting projection in stereo.

Otherwise, the light through one of the lenses is capable of being blocked out for projecting only the other of the stereoscopic image pair through the other projection lens. Or, one of the projection lenses is vertically adjustable relative to the other into a common horizontal plane for projecting non-stereo images from only the upper half or the lower half of film images.

And, after relatively adjusting the projection lenses into a common horizontal plane, the upper or lower images of the image pairs may be projected non-stereoscopically on a wide screen having angular end panels by masking selected portions of succeeding projected images.

The projector according to the invention includes a dual lamphouse arrangement each including a xenon light source, a curved reflector for forwardly projecting a reflected circular light image, a flat reflector for reflecting each light image perpendicularly toward the central axis of the projector, a spherical convex reflector for reflecting each image parallel to the central axis, and a condensor lens comprising a joined pair of planospherical and plano-cylindrical lenses for reshaping the circular light images into horizontal ellipsoidal light images. An aperture plate masks the ellipsoidal images to form horizontal rectangular light images through the film images and projection lenses on to the screen. The spherical convex reflectors and the condensor lenses for reshaping the light beams from circular to ellipsoidal provide for a gain of about 50% more light on the film gate. And, the convex mirror system maintains the light beam evenly distributed along the full surface of the screen.

Other objects, advantages and novel features of the invention will become more apparent from the following detailed description of the invention when taken in conjunction with the accompanying drawings.

BRIEF DESCRIPTION OF THE DRAWINGS

FIG. 1 is an expanded top plan view, partly in section, of the projector system according to the invention having a xenon optical system;

FIG. 2 is a perspective view of the projection lenses of the projector of FIG. 1 relative to the film strip and the projection screen;

FIG. 3 is a schematic side elevational view of a portion of the projector system of FIG. 1;

FIG. 4 is an enlarged expanded view of the condensor lens pair employed for the projector;

FIGS. 5a, 5b, 5c and 5d are top plan schematic illustrations of the projection lens pair relative to projection screens illustrating various modes of film image projection; and FIGS. 6a, 6b, 6c and 6d are views of the film strip illustrating the selected film images projected on to the screens corresponding to FIGS. 5a, 5b, 5c and 5d.

DETAILED DESCRIPTION OF THE INVENTION

Turning now to the drawings wherein like reference characters refer to like and corresponding parts throughout the several views, the projector having the optical projection system according to the invention is shown in FIG. 1 although elements not required for an understanding of the invention are omitted such as the projector housing, the projector intermittent for feeding the film, the shutter, etc.

The 70 mm wide developed picture film as herein described is developed from a 65 mm wide negative film having exposed film images shot by the camera disclosed in one of the aforementioned related applications of the same inventors named herein and entitled Stereoscopic Motion Picture Apparatus With Horizontal Film Movement. The entirety of the disclosure of that application is specifically incorporated herein by reference.

And, the picture film described herein is intended for intermittent movement by a drive mechanism disclosed in the other of the aforementioned related applications naming the same two inventors herein and entitled Geneva Drive Mechanism For Cinematograph Projection. The entirety of the disclosure of that application is specifically incorporated herein by reference.

The projector comprises a pair of lamphouses located side-by-side and spaced apart equal distances on opposite sides of a central axis 10 of the projector. The lamphouse and related elements including the condensor lens and projection lens are of the same interrelationship on both sides of axis 10, such that only those elements lying above that centerline shown in FIG. 1 will be described in detail. Those corresponding elements of the other pair of elements lying below the centerline shown in FIG. 1 will be correspondingly designated by subscripts a.

Each lamphouse includes a 7,000 watt xenon bulb 11 powered from an electrical source (not shown), and a curved light reflector 12 having a convex inner reflective surface. The lamphouses separately concentrate two light beams on the stereoscopic image couple formed on film strip 13 which will be described in more detail hereinafter. The light beams contain not only the visible spectrum but also a great amount of heat which would normally burn the film as it moves through aperture plate 14.

To prevent the possibility of burning or otherwise destroying the film strip, the circular light images produced by the lamphouses are each reflected by a cold flat mirror 15 capable of reflecting about 97% of the visible light spectrum and passing about 80% of the infrared. Flat heat screens 16 are mounted behind mirrors 15 for absorbing the infrared rays. And, blower fans 17 are operatively mounted behind screens 16 for cooling these heat screens.

The circular light beams are reflected by reflectors 12 in a forward direction from the lamphouses and are reflected by mirrors 15 perpendicularly toward axis 10. Spherical convex mirrors 18 reflect the circular light images parallel to central axis 10 along optical axes 19. Heat screens 21 mounted behind the spherical convex mirrors 18 further absorb the reflected infrared rays.

A condensor lens pair 22, more clearly shown in FIG. 4, is spaced from each spherical convex mirror along each of the optical axes 19 for collecting the light beams into converging beams. The condensor lens pair comprises a combined plano-spherical lens 23 and a plano-cylindrical lens 24 joined together at their flat sides. The condensor lens pair reshapes the circular light beams into horizontal ellipsoidal light beams parallel to the horizontal direction of movement of the film strip.

Openings 25 of aperture plate 14 are spaced along optical axes 19 forwardly of the condensor lens pair for masking the ellipsoidal images to form horizontal rectangular light images on film strip 13.

By condensing the light beams, the center of the projected image gains more light than the edges. Thus, to compensate for the uneven illumination of the film gate the reflectors 18 are convex. Reflecting a circular light beam by 90° with the convex reflectors causes the light beams to overlap at central axis 10. This extended light shape of the beam produces an even anamorphic squeeze on the outside edges of the light beam. The inside edges of the light beam are compensated by additional light overlapping in this area along axis 10. As a result a portion of the light beam reflected from lamphouse 11, 12 is spread to the other light beam reflected from lamphouse 11a, 12a, and vice-versa. This additional amount of light equalizes the reshaped light beam so that the center is only 10% higher in illumination and the remainder increase of light is equally distributed to the left and right edges of the viewing screen.

The aforedescribed light pass configuration enables the projector according to the invention to project a 3:1 image on a 50 foot high, 150 wide screen with stereo and non-stereo images of 20 foot lamberts with the film gate heat measured 50% lower than standard 35 mm projectors.

Spherical condensor lens 23 is located a short distance from projector aperture plate 14 and is approximately +4 diopter. Vertically cylindrical lens 24 is located in front of lens 23 and is likewise of approximately +4 diopter. Both lenses 23 and 24 may be produced as a single condensor lens.

The spherical surface of condensor lens 22 concentrates the edges of the circular light beam to a smaller circular light beam. The cylindrical surface of condensor lens 22 squeezes the circular light beams to a horizontal ellipsoidal light beam.

Left and right projection lenses 26 and 27 are respectively spaced along optical axes 19 forwardly of aperture plate 14 and film strip 13.

Turning to FIG. 2, the projection lenses are shown in relation to film strip 13 intended for movement from left to right in the direction of arrow 28. The film strip is a 70 mm wide film developed from the 65 mm film strip having exposed stereoscopic pairs of images formed thereon as described in one of the aforementioned related applications entitled Stereoscopic Motion Picture Apparatus With Horizontal Film Movement. Thus, left and right developed images L, R, $L_1$, $R_1$, $L_2$, $R_2$, $L_3$, $R_3$, etc., each of a stereoscopic image couple are developed on the film frames. Film strip 13 has formed along its opposite edges a plurality of spaced film feed perforations 32. Each of the film frames 29, 31 has a length (in the direction of arrow 28) equal to fifteen perforations 32 at a standard spacing used for motion picture camera and projection pull-down film feed perforations. The film contains, for example, a right image $R_1$ of a stereoscopic image couple $L_1R_1$ on a full lower half of film frame 29 on one side of longitudinal centerline 33 of the film such that the developed right image has an aspect ratio of 3:1 and occupies one-half the width of frame 29 and has a length equal to the fifteen film feed perforations 32 which define the length of each film frame.

A left image $L_1$, of the stereoscopic image pair $R_1$, $L_1$ is located on a full upper half of adjacent film frame 31 diagonally related to right image $R_1$ such that the developed left image $L_1$ has an aspect ratio of 3:1 and occupies one-half the width of adjacent frame 31 on a side of longitudinal centerline 33 opposite image $R_1$, and has a length equal to the fifteen film feed perforations 32.

Projection lenses 26 and 27 are staggered relative to each other in a vertical direction such that their optical axes 19, 19a are respectively coincident with images $R_1$ and $L_1$ of the stereoscopic image pair on the film. Thus, the projection lenses are in the same diagonal relationship as images $R_1$, $L_1$ of the stereoscopic image pair, with lens 27 being located in the optical center of image $L_1$, and with lens 26 being located in the optical center of image $R_1$.

A glass prism 34 is spaced along optical axis 19a forwardly of projection lens 27 for superimposing upper image $L_1$ with lower image $R_1$ of the stereoscopic image pair. And, convergence means 35 is connected to lenses 26, 27 for changing the convergence by adjusting the interocular distance for projecting images $R_1$, $L_1$ as a stereoscopic image on to a motion picture screen 36. This stereo projection, likewise illustrated in FIGS. 5a, 6a, is one of the capabilities of the present projector. The 70 mm projector having a xenon optical system as aforedescribed effects stereo viewing at high resolution and the elimination of eye strain when viewing stereo effects. The infinity shifting for stereo pair images is the same as standard 35 mm over and under stereo. However, the film image of the present 70 mm film is three times wider and because of that the convergence range for infinity is three times smaller in relation to the same angular viewing point as for 35 mm stereo.

Standard 35 mm infinity shifting is 1/40 of the image width. Because the film images of the present 70 mm film are three times wider, infinity shifting is 1/120 of the image width. And, the screen ratio of 3:1 moves the framing of the image outside the angles of vision which creates a stronger depth of field for stereo effects.

The projection of non-stereoscopic images is likewise made possible using the same projector and 70 mm film as set forth herein. For example, one the lamphouses such as 11, 12 may be switched off as by switch 37 (FIG. 1) such that only projection lens 27 is used for the projection of the succession of images L, $L_1$, $L_2$, etc., of the 70 mm film strip 13 (see FIGS. 5b, 6b). This non-stereoscopic "flat" image of the same film 13 is projected at a 3:1 ratio and because of this size the image creates a peripheral visual effect on screen 36. Of course, lamphouse 11a, 12a could instead be switched off such that only porjection lens 26 is used for projecting "flat" images from the lower half of the film such as R, $R_1$, $R_2$, $R_3$, etc.

Another option for non-stereoscopic projection using the same projector and film of the invention provides for the use of both lamphouses and projection lenses to produce overlapped non-stereo images from the upper row L or the lower row R of film images. For this purpose, glass wedge 34 is eliminated or moved out of the path of optical axis 19a and projection lens 26 is shifted upwardly using means 38 connected thereto (see FIG. 2). The distance D thus shifted equals the distance d between the longitudinal centerlines of images L and R. Thus, optical axes 19, 19a of the projection lens pair lie in a common horizontal plane.

And, lamphouse 11, 12 associated with projection lens 26, together with elements 15, 16, 17, 18, 21 and condensor lens 22 must be shifted through the same vertical distance D (see FIG. 3) using some suitable means such as 39. And, a different aperture plate 14A will be substituted as having side-by-side plate openings 25 rather than diagonally related. As generally shown in FIGS. 5c, 6c, overlapped images L, $L_1$, $L_2$, etc. are projected on to screen 36 by both lenses 26 and 27.

Another variant made possible for non-stereoscopic projection utilizing the same projector and film according to the invention, is generally illustrated in FIGS. 5d, 6d. A viewing screen 41 is of essentially the same overall height and width as screen 36 except that it has a narrower flat central portion 42 and connecting side panels 43 which may each form interior angles of 135° with central portion 42. Succeeding non-stereoscopic images L, $L_1$ are projected by using masks 44, 45 in aperture plate 14A. Image L (FIG. 6b) is masked to the outside to an aspect ratio of 1.33:1 or of 2:1, for example, so as to cover the central flat portion 42 of the screen as projected through lens 27. And, mask 45 is used to mask the corresponding central portion of image $L_1$ such that the remaining portion of the 3:1 aspect ratio is projected from the unmasked portion $L_1$ on to side panels 43 by projection lens 26. The images projected on to the side panels are focused closer relative to the projected image on portion 42 as needed to compensate for the difference in distance between the projection lenses and the central portion and side panels, respectively. The FIGS. 5d, 6d type non-stereoscopic viewing gives the effect of surrounding of the viewer. Of course, the elements of the projector must be adjusted through distance D as aforedescribed to facilitate this type of viewing.

Obviously, many other modifications and variations of the invention are made possible in the light of the above teachings. It is therefore to be understood that within the scope of the appended claims the invention may be practiced otherwise than as specifically described.

What is claimed is:

1. An optical projection system for cinematograph projection, comprising: a pair of lamphouses transversely spaced apart equal distances on opposite sides of a central axis of said system; said lamphouses each comprising a xenon light source and a curved reflecting means spaced from said light source for projecting a reflected circular light beam of each said source in a forward direction parallel to said axis; flat reflecting means spaced in said forward direction from each said source for reflecting each said beam perpendicularly toward said axis; spherical convex reflecting means for reflecting each said beam parallel to said central axis along a pair of optical axes; a condensor lens means spaced from each said spherical convex reflecting means along each of said optical axes for collecting the light beams into converging beams; each said lens means comprising a joined pair of plano-spherical and plano-cylindrical lenses for reshaping the circular light beams into horizontal ellipsoidal light beams; openings of an aperture plate spaced along said optical axes forwardly of said lens means for masking said ellipsoidal beams to form horizontal rectangular light images; and a pair of projection lens means repsectively spaced along said optical axes forwardly of said aperture plate.

2. The system according to claim 1, wherein infrared/heat absorbing means is spaced behind each said flat reflecting means.

3. The system according to claim 2, wherein blower fan means are provided for cooling said absorbing means.

4. The system according to claim 2, wherein heat absorbing means are spaced behind said spherical convex reflecting means.

5. The system according to claim 1, including a horizontally movable film strip having a plurality of adjacent film frames, spaced film feed perforations along opposite edges of said strip, each said frame having a length equal to fifteen of said perforations, and said film having a width of 70 mm for an aspect ratio of 3:1, said film having formed thereon a succession of right and left images of stereoscopic image couples, said right image of each couple occupying one-half the width and the full length of one of said frames on one side of the longitudinal centerline of said film, said left image of each couple being diagonally related to said right image and occupying one-half the width and the full length of another of said frames adjacent said one frame on the side of said centerline opposite said one side, said optical axes being coincident respectively with said right and left images, prism means spaced along one of said optical axes forwardly of one of said projection lenses for superimposing said right and left images, and means for converging said projection lenses for projecting said images in stereo.

6. The system according to claim 1, including a horizontally movable film strip having a plurality of adjacent film frames, spaced film feed perforations along opposite edges of said strip, each said frame having a length equal to fifteen of said perforations, and said film having a width of 70 mm for an aspect ratio of 3:1, said film having formed thereon a succession of right and left images of stereoscopic image couples, said right image of each couple occupying one-half the width and the full length of one of said frames on one side of the longitudinal centerline of said film, said left image of each couple being diagonally related to said right image and occupying one-half the width and the full length of another of said frames adjacent said one frame on the side of said centerline opposite said one side, said optical axes being coincident respectively with said right and left images, means for switching off one of said lamphouses for projecting only one of said right and left images in non-stereo.

7. The system according to claim 1, including a horizontally movable film strip having a plurality of adjacent film frames, spaced film feed perforations along opposite edges of said strip, each said frame having a length equal to fifteen of said perforations, and said filmm having a width of 70 mm for an aspect ratio of 3:1, said film having formed thereon a succession of right and left images of stereoscopic image couples, said right image of each couple occupying one-half the width and the full length of one of said frames on one side of the longitudinal centerline of said film, said left image of each couple being diagonally related to said right image and occupying one-half the width and the full length of another of said frames adjacent said one frame on the side of said centerline opposite said one side, one of said projection lenses being shiftable a distance equal to one-half the width of said images in a direction perpendicular to the horizontal movement of said film for horizontally aligning said optical axes, and one of said lamphouses, one of said flat reflecting means, one of said spherical convex reflecting means and one of said condensor lenses being shiftable said distance, whereby overlapping non-stereoscopic images of only one of said right or said left images can be projected.

8. The system according to claim 7, comprising meshing means for projecting a predetermined central portion of said one image non-stereoscopically on to a flat screen and for projecting the remaining portion of said one image non-stereoscopically on to side panel screen sections of said flat screen.

9. An optical projection system, comprising: a pair of lamphouses each including a xenon light source, said lamphouses being transversely spaced apart equal distances on opposite sides of a central axis of said system; reflecting means for projecting circular light images from said lamphouses both perpendicular to and parallel to said central axis in a forward direction along optical axes lying parallel to said central axis; a condensor lens means spaced from saiid reflecting means along said optical axes for collecting the light images into converging beams; said lens means comprising a lens having a plano-spherical surface facing toward said reflecting means and a plano-cylindrical surface facing away from said reflecting means on each said optical axis for reshaping the circular light images into horizontal ellipsoidal light images; means spaced along said optical axes forwardly of said lens means for masking said ellipsoidal images to form horizontal rectangular light images; and projection lens means spaced along said optical axes forwardly of said masking means.

10. The system according to claim 9, wherein said reflecting means includes a flat reflector spaced in said forward direction from each said source.

11. The system according to claim 10, wherein said reflecting means further includes spherical convex reflectors for projecting each of said circular light images along said optical axes.

12. The system according to claim 11, wherein heat absorbing means are spaced behind said spherical convex reflectors.

13. The system according to claim 9, wherein infrared/heat absorbing means is spaced behind each said flat reflector.

14. The system according to claim 13, wherein blower fan means are provided for cooling said absorbing means.

* * * * *